(12) United States Patent
Lu et al.

(10) Patent No.: US 12,395,890 B2
(45) Date of Patent: Aug. 19, 2025

(54) MULTI-LINK OPERATION (MLO) IN WI-FI NETWORKS

(71) Applicant: Plume Design, Inc., Palo Alto, CA (US)

(72) Inventors: Mowen Lu, Palo Alto, CA (US); Manikanden Balakrishnan, San Mateo, CA (US); William J. McFarland, Portola Valley, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 459 days.

(21) Appl. No.: 17/889,854

(22) Filed: Aug. 17, 2022

(65) Prior Publication Data

US 2024/0064571 A1 Feb. 22, 2024

(51) Int. Cl.
*H04W 28/082* (2023.01)
*H04W 72/04* (2023.01)
*H04W 76/15* (2018.01)
*H04W 84/12* (2009.01)

(52) U.S. Cl.
CPC ......... *H04W 28/082* (2023.05); *H04W 72/04* (2013.01); *H04W 76/15* (2018.02); *H04W 84/12* (2013.01)

(58) Field of Classification Search
CPC ... H04W 28/082; H04W 76/15; H04W 72/04; H04W 84/12; H04W 76/14; H04W 76/023; H04W 56/001; H04W 56/002; H04W 76/046; H04W 76/064; H04W 76/27; H04W 76/34; H04W 8/005; H04W 84/18; H04W 72/02; H04W 88/06; Y02D 30/70
See application file for complete search history.

(56) References Cited

U.S. PATENT DOCUMENTS

| 7,315,533 B2 | 1/2008 | Theobold et al. |
| 7,414,978 B2 | 8/2008 | Lun et al. |
| 7,953,403 B2 | 5/2011 | Nientiedt |
| 8,798,021 B2 | 8/2014 | Mangalvedhe et al. |

(Continued)

OTHER PUBLICATIONS

Netgear, genie Mobile App., Mar. 2017, 202-11742-01, pp. 1-57.
(Continued)

*Primary Examiner* — Rushil P. Sampat
(74) *Attorney, Agent, or Firm* — Nicholas Martin; Greenberg Traurig, LLP

(57) ABSTRACT

In a Wi-Fi system having three or more Wi-Fi devices operating over multiple Wi-Fi bands, implementations include forming first and second connections between first and second pairs of Wi-Fi device, respectively. A first group of channels is assigned to a first Wi-Fi device for communicating with a second Wi-Fi device via the first connection using a first set of connection channels selected from the first group of assigned channels. A second group of channels (different from the first group) is assigned to the second Wi-Fi device, where the second group of assigned channels includes at least the first set of connection channels. The second Wi-Fi device communicates with the third Wi-Fi device via the second wireless connection using a second set of connection channels selected from the second group of assigned channels. The first group of assigned channels is different from the second group of assigned channels.

29 Claims, 7 Drawing Sheets

(56) References Cited

U.S. PATENT DOCUMENTS

| | | |
|---|---|---|
| 9,060,279 B2 | 6/2015 | Ganu et al. |
| 9,066,251 B2 | 6/2015 | Madan et al. |
| 9,131,391 B2 | 9/2015 | Madan et al. |
| 9,131,392 B2 | 9/2015 | Madan et al. |
| 9,420,528 B2 | 8/2016 | Madan et al. |
| 9,497,700 B2 | 11/2016 | Madan et al. |
| 9,510,214 B1 | 11/2016 | Balasubramaniam et al. |
| 9,516,579 B1 | 12/2016 | Diner et al. |
| 10,057,813 B1 | 8/2018 | Likar et al. |
| 2006/0258395 A1 | 11/2006 | Cave et al. |
| 2007/0149172 A1 | 6/2007 | Dickinson |
| 2007/0206537 A1 | 9/2007 | Cam-Winget et al. |
| 2007/0242621 A1 | 10/2007 | Nandagopalan et al. |
| 2009/0257380 A1 | 10/2009 | Meier |
| 2009/0279427 A1 | 11/2009 | Ji et al. |
| 2009/0316585 A1 | 12/2009 | Srinivasan |
| 2009/0323632 A1 | 12/2009 | Nix |
| 2010/0029282 A1 | 2/2010 | Stamoulis et al. |
| 2010/0232317 A1 | 9/2010 | Jing et al. |
| 2011/0039554 A1 | 2/2011 | Bims |
| 2011/0119370 A1 | 5/2011 | Huang et al. |
| 2011/0151886 A1 | 6/2011 | Grayson et al. |
| 2012/0002567 A1 | 1/2012 | Sun et al. |
| 2012/0087268 A1 | 4/2012 | Savoor et al. |
| 2012/0122503 A1 | 5/2012 | Ma et al. |
| 2012/0257585 A1 | 10/2012 | Sydor et al. |
| 2013/0201857 A1 | 8/2013 | Bhargava et al. |
| 2013/0272285 A1 | 10/2013 | Goldsmith et al. |
| 2014/0092765 A1 | 4/2014 | Agarwal et al. |
| 2014/0126410 A1 | 5/2014 | Agarwal et al. |
| 2014/0321325 A1 | 10/2014 | Jing et al. |
| 2014/0328190 A1 | 11/2014 | Lord et al. |
| 2015/0023183 A1 | 1/2015 | Ilsar et al. |
| 2015/0215832 A1 | 7/2015 | Fitzpatrick |
| 2015/0341797 A1 | 11/2015 | Madan et al. |
| 2016/0080949 A1 | 3/2016 | Chandrasekhar et al. |
| 2017/0289837 A1 | 10/2017 | Duo et al. |
| 2018/0014341 A1* | 1/2018 | Jung ............... H04W 56/002 |
| 2018/0027604 A1* | 1/2018 | Haag ............ H04M 1/72427 |
| | | 455/553.1 |
| 2018/0254955 A1 | 9/2018 | Ranjan et al. |
| 2018/0324607 A1 | 11/2018 | Rengarajan et al. |
| 2018/0338336 A1* | 11/2018 | Seo .................. H04W 88/06 |
| 2019/0137596 A1 | 5/2019 | Silverman et al. |

OTHER PUBLICATIONS

Plaff et al., RFC 7047, The Open vSwitch Database Management Protocol, Dec. 2013.

Jun. 26, 2017 International Search Report for International Application No. PCT/US2017/023130.

Dec. 18, 2020, International Search Report and Written Opinion for International Patent Application No. PCT/US2020/050633.

\* cited by examiner

2.4 GHz Band

| Ch. | Frequency Range (MHz) |
|---|---|
| 1 | 2401-2423 |
| 2 | 2406-2428 |
| 3 | 2411-2433 |
| 4 | 2416-2438 |
| 5 | 2421-2443 |
| 6 | 2426-2448 |
| 7 | 2431-2453 |
| 8 | 2436-2458 |
| 9 | 2441-2463 |
| 10 | 2446-2468 |
| 11 | 2451-2473 |
| 12 | 2456-2478 |
| ⋮ | ⋮ |

*FIG. 6*

5 GHz Band

| Ch. | Frequency Range (MHz) |
|---|---|
| ⋮ | ⋮ |
| 40 | 5190-5210 |
| 42 | 5170-5250 |
| 44 | 5210-5230 |
| 46 | 5210-5250 |
| ⋮ | ⋮ |
| 104 | 5510-5530 |
| 106 | 5490-5570 |
| 108 | 5530-5550 |
| 110 | 5530-5570 |
| ⋮ | ⋮ |
| 122 | 5570-5650 |
| 124 | 5610-5630 |
| 126 | 5610-5650 |
| 128 | 5630-5650 |
| ⋮ | ⋮ |
| 153 | 5755-5775 |
| 155 | 5735-5815 |
| 157 | 5775-5795 |
| 159 | 5775-5815 |
| 161 | 5795-5815 |
| ⋮ | ⋮ |

*FIG. 7*

6 GHz Band

| Ch. | Frequency Range (MHz) |
|---|---|
| 1 | 5945-5965 |
| 5 | 5965-5985 |
| 9 | 5985-6005 |
| 13 | 6005-6025 |
| 17 | 6025-6045 |
| 21 | 6045-6065 |
| 25 | 6065-6085 |
| 29 | 6085-6105 |
| 33 | 6105-6125 |
| 37 | 6125-6145 |
| ⋮ | ⋮ |
| 57 | 6225-6245 |
| 61 | 6245-6265 |
| 65 | 6265-6285 |
| 69 | 6285-6305 |
| 73 | 6305-6325 |
| 77 | 6325-6345 |
| 81 | 6345-6365 |
| 85 | 6365-6385 |
| 89 | 6385-6405 |
| 93 | 6405-6425 |
| ⋮ | ⋮ |

*FIG. 8*

MULTI-LINK OPERATION (MLO) IN WI-FI NETWORKS

FIELD OF THE DISCLOSURE

The present disclosure generally relates to wireless networking systems and methods. More particularly, the present disclosure relates to systems and methods for enabling Multi-Link Operation (MLO) in Wi-Fi networks.

BACKGROUND OF THE DISCLOSURE

Wi-Fi networks (i.e., wireless local area networks (WLAN) based on the IEEE 802.11 standards) are ubiquitous. In fact, Wi-Fi is the most common technique for user device connectivity, and the applications that run over Wi-Fi are continually expanding. For example, Wi-Fi is used to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. That is, Wi-Fi has become the primary connection between user devices and the Internet in the home or other locations. The vast majority of connected devices use Wi-Fi for their primary network connectivity. As such, there is a need to ensure applications run smoothly over Wi-Fi. There are various optimization techniques for adjusting network operating parameters such as described in commonly assigned U.S. patent application Ser. No. 16/032,584, filed Jul. 11, 2018, and entitled "Optimization of distributed Wi-Fi networks," the contents of which are incorporated by reference herein.

Wi-Fi is continuing to evolve with newer generations of technology, including IEEE 802.11a, 802.11b, 802.11g, 802.11n, 802.11ac, and 802.11ax (referred to as Wi-Fi 6/6E), and future Wi-Fi 7. Each generation of technology evolves the Wi-Fi Media Access Control (MAC) and Physical (PHY) layers to add more capabilities. In the case of IEEE 802.11ax, orthogonal frequency-division multiple access (OFDMA) has been added as a technique aimed at improving the efficiency of Wi-Fi communication when many small packets are being transmitted to or from multiple client devices. OFDMA can operate both in the downlink (one access point communicating simultaneously to multiple clients), or in the uplink (multiple clients communicating simultaneously to a single access point).

The next generation Wi-Fi protocol (i.e., IEEE 802.11be, referred to as "Wi-Fi 7") will introduce, among other things, Multi-Link Operation (MLO). MLO is configured to enable two wireless devices to communicate multiple channels (or "links") over the same wireless communication pipe. Thus, a Wi-Fi system may use two separate frequency channels, typically in separate bands, between two Wi-Fi devices. In Wi-Fi 7, three different bands may be used, where the bands, as referred to herein, may include the frequency bands referred to in Wi-Fi literature as the "2.4 GHz band," "5 GHz band," and "6 GHz band."

MLO enables link aggregation, which may be similar to Link Aggregation Group (LAG) techniques used in Ethernet systems. Regarding traffic assignment policies, packets are assigned in parallel to both channels and the receiving Wi-Fi device is configured to aggregate the traffic from both channels at its receiver to produce an aggregated throughput that is the sum of the throughput capable on each channel. Regarding interference avoidance policies, the Wi-Fi system may use one channel (e.g., a first channel, default channel, master channel, etc.) as a primary channel that handles all or most of the traffic. Another channel (e.g., a second channel, failover channel, backup channel, etc.) may be used chiefly when the first channel is faulty or congested. Traffic may then switch over to the second channel only when the first channel is occupied when it is ready to transmit. This failover can be done on a packet-by-packet basis, returning to the first channel to transmit the next packet if the first channel becomes free.

In this manner, MLO may use additive throughput of the packets split between the two links (or channels). For example, the use of the 5 GHz and 6 GHz bands may aggregate the packets to achieve a data rate up to 7.2 times greater than that of Wi-Fi 6. Thus, MLO can lower latency due to the access to multiple links (channels) in parallel. This also provide high reliability by packet duplication over multiple links and may assign data flows to specific links based on the needs of an application, such as Virtual Reality (VR) apps, Augmented Reality (AR) apps, industrial Internet of Things (IoT) apps, etc.

Many of the conventional Wi-Fi systems operating under Wi-Fi 4, Wi-Fi 5, and Wi-Fi 6 have used the same frequency channel for all backhaul links and will likely use the same pair of frequency channels for all backhaul links in Wi-Fi 7 mesh solutions as well. In addition, these conventional systems will likely assign the same channel as the first channel throughout the MLO links used in these mesh networks. As such, these conventional system have a number of disadvantages. First, one portion of the network will interfere with another portion of the network, particularly considering traffic streams that must traverse multiple hops to get to the destination. This self-interference can also be referred to as "congestion." Also, these conventional systems will normally be more susceptible to interference from a neighbor, if the neighbor is transmitting on one of the channels utilized in the MLO links. Thus, throughput and reliability will be degraded in this case. Another disadvantage of conventional Wi-Fi systems is that the pairs of channels used in the MLO links will be correlated throughout the system. Thus, if there is interference on one of the channels in the MLO pairs (either from a neighbor or from another part of the network), all links will try to use the same second (backup) channel that is part of the MLO pairs, creating more collisions and congestion on that second channel. Therefore, there is a need in the field of Wi-Fi networks to overcome these deficiencies of the conventional systems in order to avoid collisions as much as possible and reduce likely interference events.

BRIEF SUMMARY OF THE DISCLOSURE

The present disclosure relates to systems and methods for reducing the possibility of interference in a Wi-Fi system or other local wireless network. A Wi-Fi system, according to various embodiments of the present disclosure, may include at least first, second, and third Wi-Fi devices. Each Wi-Fi device may have one or more radios configured to operate over multiple Wi-Fi bands (e.g., the 6 GHz, 5 GHz, and 2.4 GHz bands, as defined in the Wi-Fi protocols). Each Wi-Fi band, for example, may include a plurality of accessible channels, where each channel has a predetermined frequency range. A first wireless connection is formed between the first and second Wi-Fi devices enabling communication between the first and second Wi-Fi devices. A second wireless connection is formed between the second and third Wi-Fi devices enabling communication between the second and third Wi-Fi devices.

A first group of channels (selected from the accessible channels of the multiple Wi-Fi bands) is assigned to the one or more radios of the first Wi-Fi device. The one or more radios of the first Wi-Fi device are configured to communicate with the second Wi-Fi device via the first wireless connection using a first set of connection channels selected from the first group of assigned channels. Also, a second group of channels selected from the accessible channels of the multiple Wi-Fi bands is assigned to the one or more radios of the second Wi-Fi device, the second group of assigned channels including at least the first set of connection channels. The one or more radios of the second Wi-Fi device are configured to communicate with the third Wi-Fi device via the second wireless connection using a second set of connection channels selected from the second group of assigned channels. The first group of assigned channels is different from the second group of assigned channels.

A third group of channels selected from the accessible channels of the multiple Wi-Fi bands may be assigned to the one or more radios of the third Wi-Fi device. The third group of assigned channels may include at least the second set of connection channels. Also, the second group of assigned channels may be different from the third group of assigned channels. The first set of connection channels may be different from the second set of connection channels. In some embodiments, the Wi-Fi system may further comprise a controller, which may be configured to assign the first, second, and third groups of channels to the first, second, and third Wi-Fi devices, respectively. Also, the controller may further be configured to establish the first and second sets of connection channels for the first and second wireless connections, respectively. The controller may further be configured to change the accessible channels of the second group of assigned channels that are not included in the first set of connection channels.

The controller may further be configured to establish the first and second sets of connections channels according to one or more traffic-enhancing techniques, which may include a) enhancing traffic per connection channel, b) enhancing traffic per respective set of connection channels, c) enhancing traffic for the entire Wi-Fi system, d) enhancing traffic with knowledge of traffic loads, e) enhancing traffic with knowledge of traffic flow priorities, f) enhancing traffic with knowledge of Wi-Fi device priorities, g) enhancing traffic with knowledge of capabilities of the sets of connection channels, and/or other techniques. The one or more traffic-enhancing techniques may be based on diversity among the channels of the first set of connection channels and the channels of the second set of connection channels. The one or more traffic-enhancing techniques may be configured to determine a likelihood of contention, collision, and/or interference caused by the same channel being used in both the first and second sets of connection channels and thereby reduce the contention, collision, and/or interference based on the determined likelihood.

In some embodiments, one or more of the Wi-Fi devices may be tri-band Access Point (AP) devices. Each of the first and second wireless connections may be configured to correspondingly pair the Wi-Fi devices in a parent/child relationship as described above. The multiple Wi-Fi bands may include the 2.4 GHz band, the 5 GHz band, and the 6 GHz band defined in the IEEE 802.11 family of protocols, whereby each of the first, second, and third groups of channels may include one or more accessible channels from each of the 2.4 GHz, 5 GHz, and 6 GHz bands. The first set of connection channels may include two accessible channels from first and second different Wi-Fi bands and the second set of connection channels may include two accessible channels from first and third different Wi-Fi bands. The Wi-Fi system may further include a gateway device. The gateway device may be configured to connect the Wi-Fi system to the Internet. The use of connection channels in the 2.4 GHz band may be reduced in the topology of the Wi-Fi system near the gateway device (e.g., not used in the first wireless connection).

Each Wi-Fi device may be configured to utilize the respective one or more radios to simultaneously transmit and receive packets over the respective sets of connection channels. For example, in some embodiments, high throughput traffic may be directed in a downlink direction (e.g., parent-to-child or top-to-bottom direction on the page) and low throughput traffic may be directed in an uplink direction (e.g., child-to-parent or bottom-to-top direction on the page).

The assignment of traffic, according to the following description, may be performed by the controller mentioned above. For example, each of the first and second sets of connection channels may include a primary channel and an extension channel in parallel. Each Wi-Fi device may include an aggregation component configured to aggregate packets received over the primary channel and extension channel. According to various embodiments, the first set of connection channels may include a first accessible channel as the primary channel and a second accessible channel as the extension channel, and subsequent sets of connection channels may include the second accessible channel as the primary channel and/or the first accessible channel as the extension channel. In some embodiments, packets may be transmitted over the primary channels during normal operation and then the packets may be transmitted over the extension channels when there is congestion on the primary channels. In some embodiments, high-priority packets may be transmitted over the primary channels and low-priority packets are transmitted over the extension channels. In some embodiments, airtime usage with respect to the primary channel and extension channel may be partitioned between the primary channel and extension channel according to a predetermined ratio and/or current usage information.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 6-8 are tables showing the frequency ranges of some of the channels of the 2.4 GHz, 5 GHz, and 6 GHz bands, respectively, defined in IEEE 802.11.

DETAILED DESCRIPTION OF THE DISCLOSURE

Figure 1:
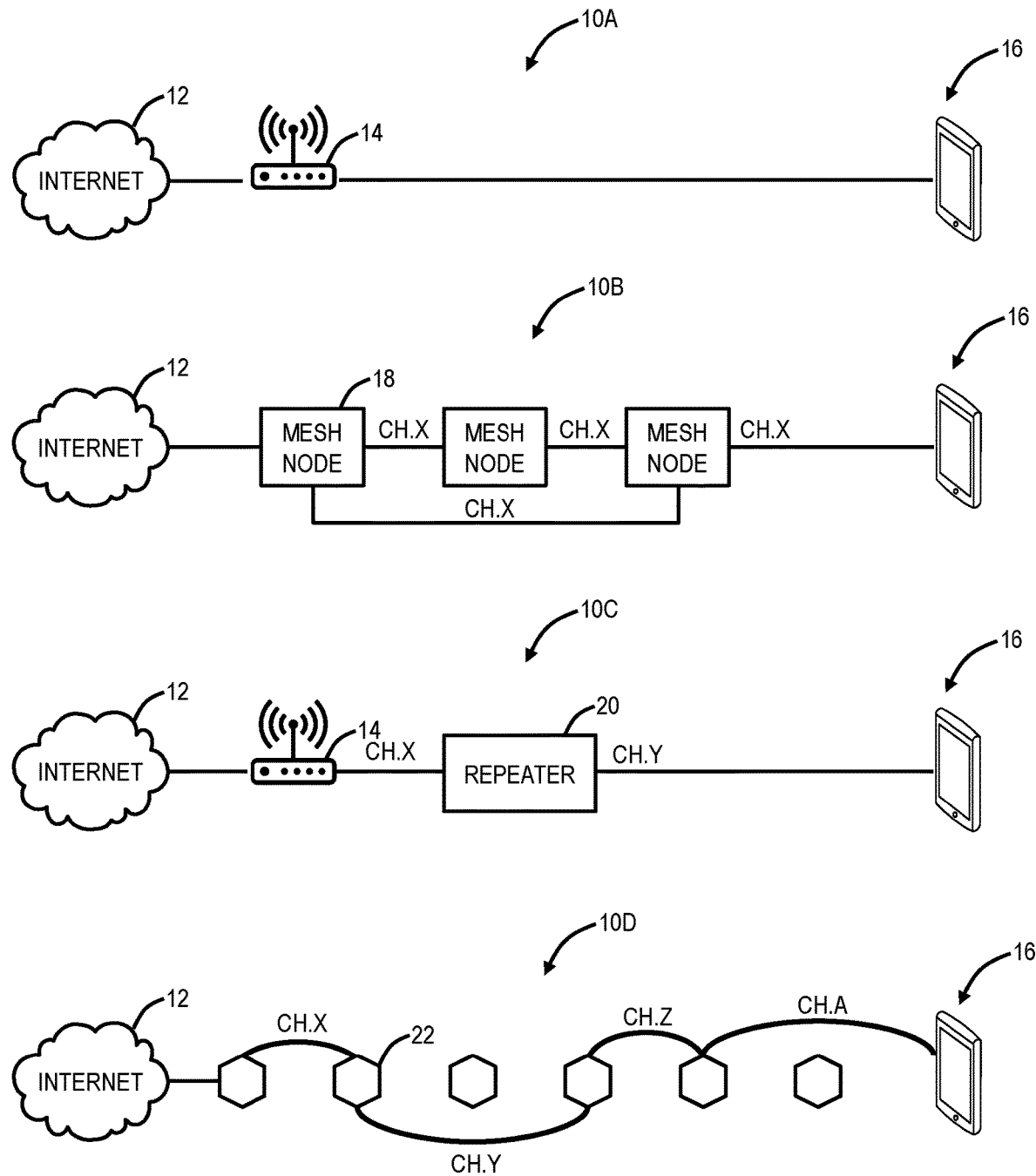
FIG. 1 is a network diagram of various Wi-Fi network topologies for connectivity to the Internet.

The present disclosure relates to systems and methods for avoiding or reducing contention, interference, and/or collisions in Wi-Fi networks. With the advent of Multi-Link Operation (MLO) policies in the Wi-Fi 7 protocol, multiple channels (e.g., referred to as "links" in other literature) can be used between multiple pairs of Wi-Fi devices, opening up the possibility of multiple configurations of channel assignments in a Wi-Fi system. The systems and methods of the present disclosure are configured to overcome the deficiencies of the conventional systems by changing the channels used between each pair of Wi-Fi devices to thereby reduce interference.

The systems and methods described herein may use two separate frequency channels between any pair of Wi-Fi devices. Typically, these two frequency channels may be selected from separate bands defined in Wi-Fi protocols, such as the family of IEEE 802.11 protocols, including Wi-Fi 7. Again, Wi-Fi 7 incorporates MLO traffic assignment policies, which are structured in the present disclosure by a controller to utilize many different accessible channels (e.g., used in parallel in MLO) to thereby reduce potential interference events. A receiving Wi-Fi device can then take the packets transmitted in parallel along the multiple channels and aggregate the packets as needed to thereby increase throughput.

In order to avoid (or reduce) interference caused by the wireless transmission of packets over the same channel, traffic may be assigned to different channels. Some Wi-Fi devices, as described in the present disclosure, may be configured to have a channel that is switched with respect to another channel of a parent device. This is configured to utilize a greater number of different channels. In the two channels used in MLO between a pair of Wi-Fi devices, one channel may be referred to as a primary channel (e.g., a first channel, default channel, etc.) and another channel may be referred to as an extension channel (e.g., a second channel, backup channel, failover channel, etc.). The two channels may be according to any suitable assignment as described in the present disclosure. For example, a controller in the Wi-Fi system may be configured to control the radios of each Wi-Fi device to provide a system having a reduced possibility of interference.

During the development of the Wi-Fi 4, Wi-Fi 5, and Wi-Fi 6 protocols, the present applicant provided applications for assigning, as much as possible, different channels for each of the links in a Wi-Fi mesh network. These channel assignments were chosen by an optimization system. Constraints regarding the number of different radios and frequency channels available in each Access Point (AP) device were applied to that optimization to ensure that the topology would be realizable and fully connected. Similarly, these same techniques can be applied to the future Wi-Fi 7 protocol, including the use of MLO channels (or links). For example, traffic-enhancement optimization may involve processing decisions including 1) assigning the channel frequencies used on each wireless connection pipe (e.g., including potentially using two channels (MLO) on some wireless pipes and one channel on others), and 2) selecting the traffic division policy on each pipe (which may be referred to in some cases as the "link"), which may include, among other things, identifying which channel will serve as the first channel and which channel will serve as the second channel in any MLO pair. In some embodiments, the systems, methods, and Wi-Fi controllers of the present disclosure may make these decisions in an automated and optimized manner. For example, an optimization system may be created in a Wi-Fi controller that can make the decisions to maximize specific objective functions.

As with Wi-Fi 4, 5, 6 optimization, Wi-Fi 7 optimization may also need to respect a number of constraints, some of which are new with respect to MLO. In particular, a radio/band that is used to communicate with a parent Wi-Fi device may only communicate with a child device on that same channel. To change the channel(s) being used across the network, an AP may use at least one different radio/band to communicate to its respective child Wi-Fi device as it might use to communicate to its parent. However, some improvements can be achieved even when the same pair of channels are used to construct an MLO link to a parent and child. In the case that the aggregation method on the links is interference avoidance, the channel assignments for the first and second channels can be reversed in some cases, so that the links may generally transmit packets on different channels.

Wi-Fi Network Topologies

FIG. 1 is a network diagram of various Wi-Fi network 10 (namely Wi-Fi networks 10A-10D) topologies for connectivity to the Internet 12. The Wi-Fi network 10 can operate in accordance with the IEEE 802.11 protocols and variations thereof. The Wi-Fi network 10 is deployed to provide coverage in a physical location, e.g., home, business, store, library, school, park, etc. The differences in the topologies of the Wi-Fi networks 10 are that they provide different scope of physical coverage. As described herein and as known in the art, the Wi-Fi network 10 can be referred to as a network, a system, a Wi-Fi network, a Wi-Fi system, a cloud-based Wi-Fi system, etc. The access points 14 and equivalent (i.e., mesh nodes 18, repeater 20, and devices 22) can be referred to as nodes, access points, Wi-Fi nodes, Wi-Fi access points, etc. The objective of the nodes is to provide network connectivity to Wi-Fi client devices 16 which can be referred to as client devices, user equipment, user devices, clients, Wi-Fi clients, Wi-Fi devices, etc. Note, those skilled in the art will recognize the Wi-Fi client devices 16 can be mobile devices, tablets, computers, consumer electronics, home entertainment devices, televisions, Internet of Things (IoT) devices, or any network-enabled device.

The Wi-Fi network 10A includes a single access point 14, which can be a single, high-powered access point 14, which may be centrally located to serve all Wi-Fi client devices 16 in a location. Of course, a typical location can have several walls, floors, etc. between the single access point 14 and the Wi-Fi client devices 16. Plus, the single access point 14 operates on a single channel (or possible multiple channels with multiple radios), leading to potential interference from neighboring systems. The Wi-Fi network 10B is a Wi-Fi mesh network that solves some of the issues with the single access point 14 by having multiple mesh nodes 18, which distribute the Wi-Fi coverage. Specifically, the Wi-Fi network 10B operates based on the mesh nodes 18 being fully interconnected with one another, sharing a channel such as a channel X between each of the mesh nodes 18 and the Wi-Fi client device 16. That is, the Wi-Fi network 10B is a fully interconnected grid, sharing the same channel, and allowing multiple different paths between the mesh nodes 18 and the Wi-Fi client device 16. However, since the Wi-Fi network 10B uses the same backhaul channel, every hop between source points divides the network capacity by the number of hops taken to deliver the data. For example, if it takes three hops to stream a video to a Wi-Fi client device 16, the Wi-Fi network 10B is left with only ⅓ the capacity.

The Wi-Fi network 10C includes the access point 14 coupled wirelessly to a Wi-Fi repeater 20. The Wi-Fi network 10C with the repeaters 20 is a star topology where there is at most one Wi-Fi repeater 20 between the access point 14 and the Wi-Fi client device 16. From a channel perspective, the access point 14 can communicate to the Wi-Fi repeater 20 on a first channel, Ch. X, and the Wi-Fi repeater 20 can communicate to the Wi-Fi client device 16 on a second channel, Ch. Y. The Wi-Fi network 10C solves the problem with the Wi-Fi mesh network of requiring the same channel for all connections by using a different channel or band for the various hops (note, some hops may use the same channel/band, but it is not required), to prevent slowing down the Wi-Fi speed. One disadvantage of the repeater 20 is that it may have a different service set identifier (SSID), from the access point 14, i.e., effectively different Wi-Fi networks from the perspective of the Wi-Fi client devices 16.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including: i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high-definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems, as illustrated in the Wi-Fi networks 1A, 10B, 10C. The first approach (the Wi-Fi network 10A) is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of the link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location, as illustrated in the Wi-Fi networks 10B, 10C. This approach is a fundamentally better approach to achieving better coverage. By placing even a single repeater 20 in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters 20. A fully interconnected mesh adds the ability for all the mesh nodes 18 to be able to communicate with each other, opening the possibility of packets being delivered via multiple hops following an arbitrary pathway through the network.

The Wi-Fi network 10D includes various Wi-Fi devices 22 that can be interconnected to one another wirelessly (Wi-Fi wireless backhaul links) or wired, in a tree topology where there is one path between the Wi-Fi client device 16 and the gateway (the Wi-Fi device 22 connected to the Internet), but which allows for multiple wireless hops unlike the Wi-Fi repeater network and multiple channels unlike the Wi-Fi mesh network. For example, the Wi-Fi network 10D can use different channels/bands between Wi-Fi devices 22 and between the Wi-Fi client device 16 (e.g., Ch. X, Y, Z, A), and, also, the Wi-Fi system 10 does not necessarily use every Wi-Fi device 22, based on configuration and optimization. The Wi-Fi network 10D is not constrained to a star topology as in the Wi-Fi repeater network which at most allows two wireless hops between the Wi-Fi client device 16 and a gateway. Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the Wi-Fi network 10D. By selecting different Wi-Fi channels between the Wi-Fi devices 22, interference and congestion can be avoided or minimized.

Of note, the systems and methods described herein contemplate operation through any of the Wi-Fi networks 10, including other topologies not explicated described herein. Also, if there are certain aspects of the systems and methods which require multiple nodes in the Wi-Fi network 10, this would exclude the Wi-Fi network 10A.

Cloud-Based Control

Figure 2:
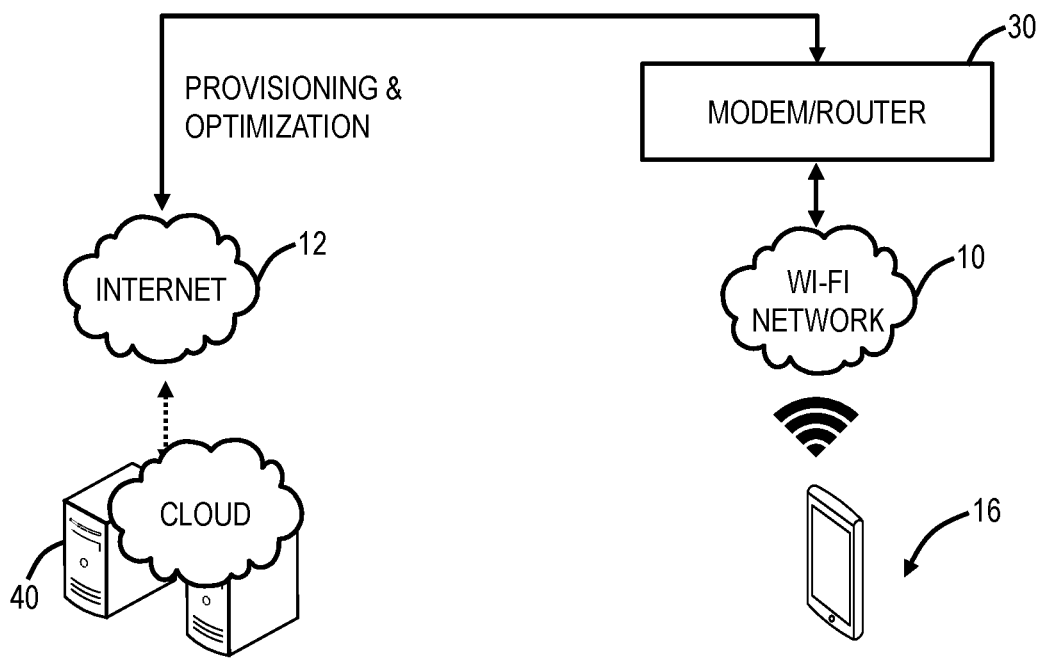
FIG. 2 is a network diagram of the Wi-Fi network with cloud-based control.

FIG. 2 is a network diagram of the Wi-Fi network 10 with cloud-based control. The Wi-Fi network 10 includes a gateway device which is any of the access points 14, the mesh node 18, or the Wi-Fi device 22 that connects to a modem/router 30 that is connected to the Internet 12. For external network connectivity, the modem/router 18 which can be a cable modem, Digital Subscriber Loop (DSL) modem, cellular interface, or any device providing external network connectivity to the physical location associated with the Wi-Fi network 10. In an embodiment, the Wi-Fi network 10 can include centralized control such as via a cloud service 40 located on the Internet 12 and configured to control multiple Wi-Fi networks 10. The cloud service 40 can receive measurement data, analyze the measurement data, and configure the nodes in the Wi-Fi network 10 based thereon. This cloud-based control is contrasted with a conventional operation that relies on a local configuration such as by logging in locally to an access point.

Distributed Wi-Fi Network

FIG. 2 may also be a network diagram of an example implementation the Wi-Fi network 10D, as a distributed Wi-Fi network in a tree topology. The distributed Wi-Fi network 10D includes a plurality of access points 22 which can be distributed throughout a location, such as a residence, office, or the like. That is, the distributed Wi-Fi 10D contemplates operation in any physical location where it is inefficient or impractical to service with a single access point, repeaters, or a mesh system. In a typical deployment, the distributed Wi-Fi network 10D can include between 1 to 12 access points or more in a home. A large number of access points 22 (which can also be referred to as nodes in the distributed Wi-Fi system 10) ensures that the distance between any access point 22 is always small, as is the distance to any Wi-Fi client device 16 needing Wi-Fi service. That is, an objective of the distributed Wi-Fi network 10D is for distances between the access points 22 to be of similar size as distances between the Wi-Fi client devices 16 and the associated access point 22. Such small distances ensure that every corner of a consumer's home is well covered by Wi-Fi signals. It also ensures that any given hop in the distributed Wi-Fi network 10D is short and goes through few walls. This results in very strong signal strengths for each hop in the distributed Wi-Fi network 10D, allowing the use of high data rates, and providing robust operation.

For external network connectivity, one or more of the access points 14 can be connected to a modem/router 30 which can be a cable modem, Digital Subscriber Loop (DSL) modem, or any device providing external network connectivity to the physical location associated with the distributed Wi-Fi network 10D.

While providing excellent coverage, a large number of access points 22 (nodes) presents a coordination problem. Getting all the access points 22 configured correctly and communicating efficiently requires centralized control. This control is preferably done via the cloud service 40 that can be reached across the Internet 12 and accessed remotely such as through an application ("app") running on a client device 16. That is, in an exemplary aspect, the distributed Wi-Fi network 10D includes cloud-based control (with a cloud-based controller or cloud service) to optimize, configure, and monitor the operation of the access points 22 and the Wi-Fi client devices 16. This cloud-based control is contrasted with a conventional operation which relies on a local configuration such as by logging in locally to an access point. In the distributed Wi-Fi network 10D, the control and optimization does not require local login to the access point 22, but rather the Wi-Fi client device 16 communicating with the cloud service 4, such as via a disparate network (a different network than the distributed Wi-Fi network 10D) (e.g., LTE, another Wi-Fi network, etc.).

The access points 22 can include both wireless links and wired links for connectivity. In the example of FIG. 2, the access point 22 has an exemplary gigabit Ethernet (GbE) wired connection to the modem/router 40. Optionally, the access point 22 may also have a wired connection to the modem/router 40, such as for redundancy or load balancing. Also, the access points 22 can have a wireless connection to the modem/router 40. Additionally, the access points 22 can have a wireless gateway such as to a cellular provider as is described in detail herein. The access points 22 can have wireless links for client connectivity (referred to as a client link) and for backhaul (referred to as a backhaul link). The distributed Wi-Fi network 10F differs from a conventional Wi-Fi mesh network in that the client links and the backhaul links do not necessarily share the same Wi-Fi channel, thereby reducing interference. That is, the access points 22 can support at least two Wi-Fi wireless channels—which can be used flexibly to serve either the client link or the backhaul link and may have at least one wired port for connectivity to the modem/router 40, or for connection to other devices. In the distributed Wi-Fi network 10D, only a small subset of the access points 22 require direct connectivity to the modem/router 40 with the non-connected access points 22 communicating with the modem/router 40 through the backhaul links back to the connected access points 22. Of course, the backhaul links may also be wired Ethernet connections, such as in a location having a wired infrastructure.

Access Point

Figure 3:
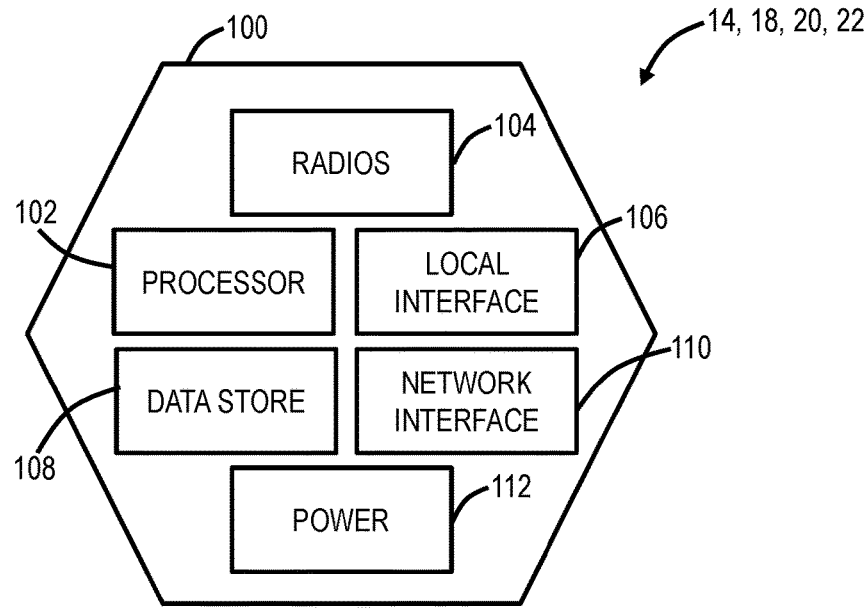
FIG. 3 is a block diagram of functional components of the access points, mesh nodes, repeaters, etc., in the Wi-Fi networks of FIG. 1.

FIG. 3 is a block diagram of functional components of the access points 14, mesh nodes 18, repeaters 20, etc. ("node") in the Wi-Fi networks 10. The node includes a physical form factor 100 which contains a processor 102, a plurality of radios 104A, 104B, a local interface 106, a data store 108, a network interface 110, and power 112. It should be appreciated by those of ordinary skill in the art that FIG. 3 depicts the node in an oversimplified manner, and a practical embodiment may include additional components and suitably configured processing logic to support features described herein or known or conventional operating features that are not described in detail herein.

In an embodiment, the form factor 100 is a compact physical implementation where the node directly plugs into an electrical socket and is physically supported by the electrical plug connected to the electrical socket. This compact physical implementation is ideal for a large number of nodes distributed throughout a residence. The processor 102 is a hardware device for executing software instructions. The processor 102 can be any custom made or commercially available processor, a central processing unit (CPU), an auxiliary processor among several processors, a semiconductor-based microprocessor (in the form of a microchip or chipset), or generally any device for executing software instructions. When the node is in operation, the processor 102 is configured to execute software stored within memory or the data store 108, to communicate data to and from the memory or the data store 108, and to generally control operations of the access point 14 pursuant to the software instructions. In an embodiment, the processor 102 may include a mobile optimized processor such as optimized for power consumption and mobile applications.

The radios 104A enable wireless communication in the Wi-Fi network 10. The radios 104S can operate according to the IEEE 802.11 standard. The radios 104B support cellular connectivity such as Long Term Evolution (LTE), 5G, and the like. The radios 104A, 104B include address, control, and/or data connections to enable appropriate communications on the Wi-Fi network 10 and a cellular network, respectively. As described herein, the node can include a plurality of radios 104A to support different links, i.e., backhaul links and client links. The radios 104A can also include Wi-Fi chipsets configured to perform IEEE 802.11 operations. In an embodiment, an optimization can determine the configuration of the radios 104S such as bandwidth, channels, topology, etc. In an embodiment, the node supports dual-band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the node can support IEEE 802.11AC1200 gigabit Wi-Fi (300+867 Mbps). Also, the node can support additional frequency bands such as 6 GHz, as well as cellular connections. The radios 104B can include cellular chipsets and the like to support fixed wireless access. Also, the radios 104A, 104B include antennas designed to fit in the form factor 100.

The local interface 106 is configured for local communication to the node and can be either a wired connection or wireless connection such as Bluetooth or the like. Since the node can be configured via the cloud service 40, an onboarding process is required to first establish connectivity for a newly turned-on node. In an embodiment, the node can also include the local interface 106 allowing connectivity to a Wi-Fi client device 16 for onboarding to the Wi-Fi network 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the node. The network interface 110 may be used to enable the node communicates to the modem/router 40. Also, the network interface 110 can be used to provide local connectivity to a Wi-Fi client device 16 or another access point 22. For example, wiring in a device to a node can provide network access to a device that does not support Wi-Fi. In an embodiment, all of the nodes in the Wi-Fi network 10D include the network interface 110. In another embodiment, select nodes, which connect to the modem/router 30 or require local wired connections have the network interface 110. The network interface 110 may include, for example, an Ethernet card or adapter (e.g., 10BaseT, Fast Ethernet, Gigabit Ethernet, 10GbE). The network interface 110 may include address, control, and/or data connections to enable appropriate communications on the network.

The processor 102 and the data store 108 can include software and/or firmware which essentially controls the operation of the node, data gathering and measurement control, data management, memory management, and communication and control interfaces with the cloud service 40. The processor 102 and the data store 108 may be configured to implement the various processes, algorithms, methods, techniques, etc. described herein.

Cloud Server and User Device

Figure 4:
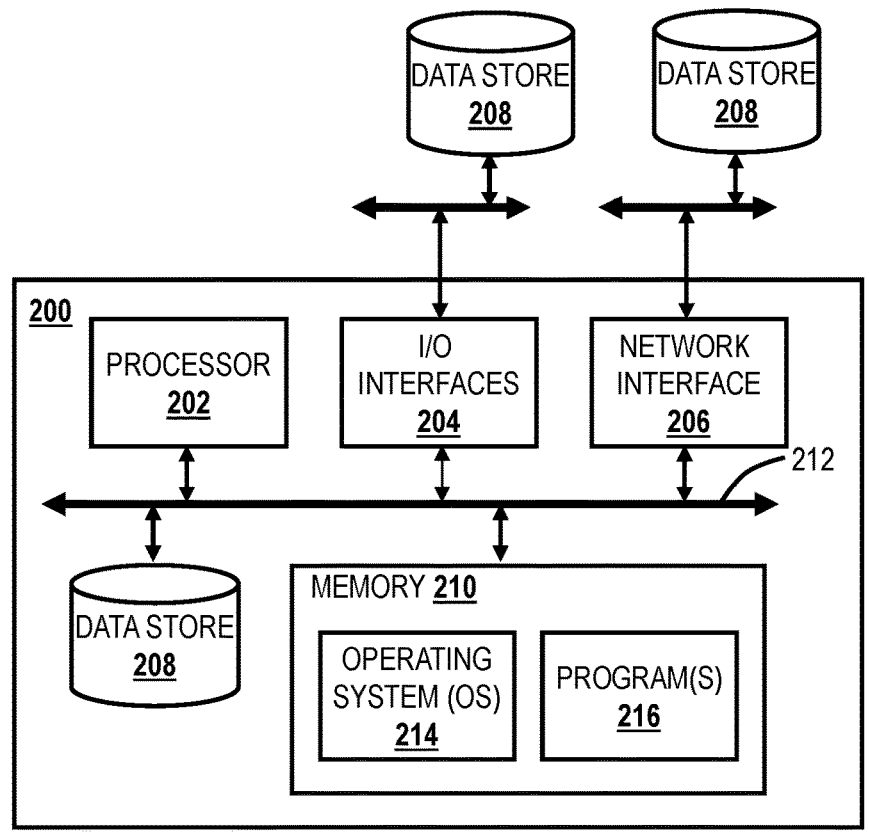
FIG. 4 is a block diagram of functional components of a server, a Wi-Fi client device, or a user device that may be used with the Wi-Fi network of FIG. 1 and/or the cloud-based control of FIG. 3.

FIG. 4 is a block diagram of functional components of a server 200, a Wi-Fi client device 16, or a user device that may be used with the Wi-Fi network of FIG. 1 and/or the cloud-based control of FIG. 2. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, InfiniBand, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the cloud service 40. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization.

Traffic-Enhancing Optimization

Figure 5:
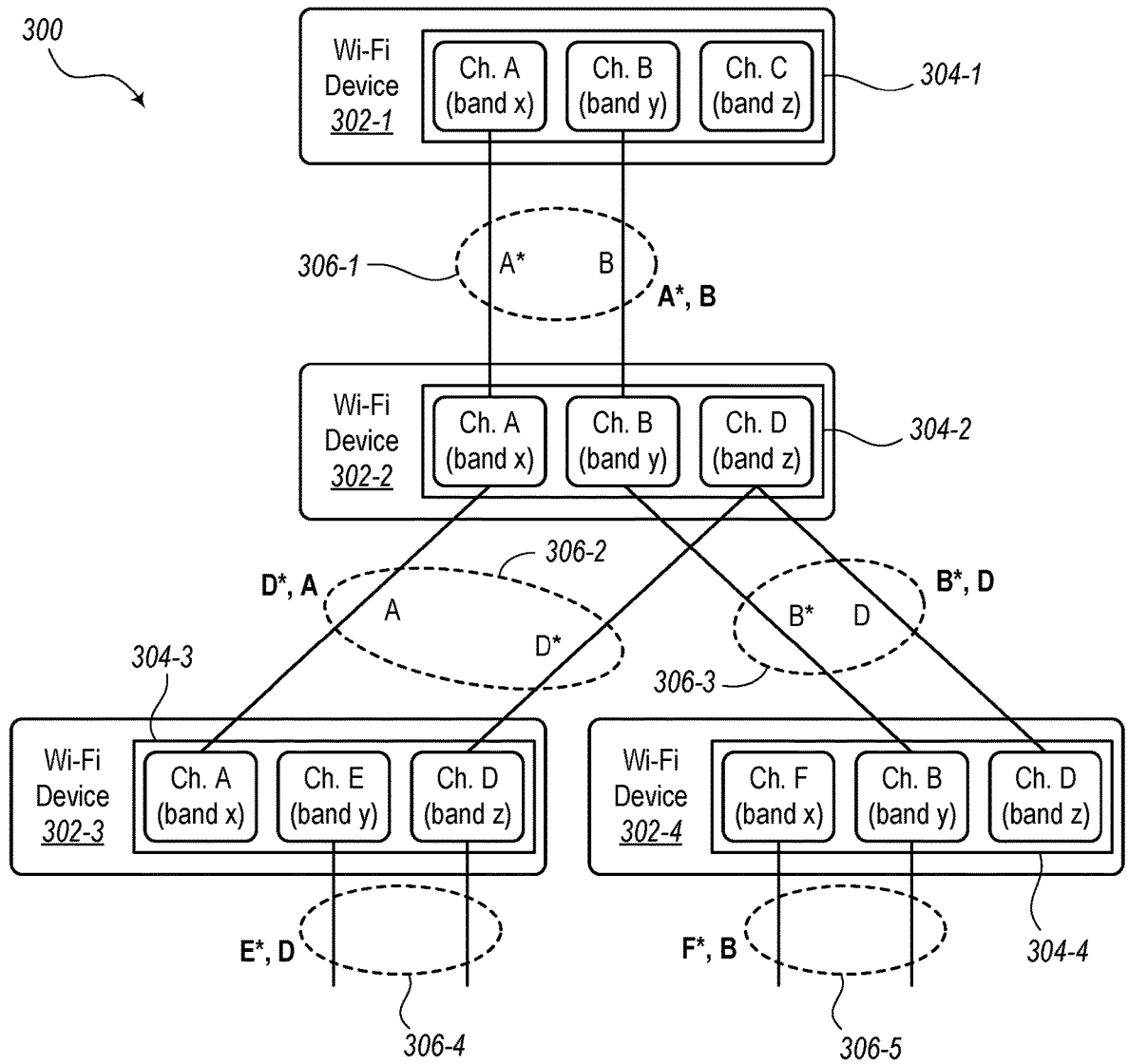
FIG. 5 is a network diagram of a Wi-Fi system having a plurality of Wi-Fi devices whereby radios of the Wi-Fi devices are assigned different channels to reduce interference.

FIG. 5 is a network diagram illustrating an embodiment of a Wi-Fi system 300 (or sub-system of a Wi-Fi network) having a plurality of Wi-Fi devices, whereby radios of the Wi-Fi device may be assigned different channels to strategically reduce the probability of interference in the Wi-Fi system 300 and enhance traffic flow. As shown, the Wi-Fi system 300 includes a plurality of Wi-Fi devices 302-1, 302-2, 302-3, 302-4 and may include fewer or additional Wi-Fi devices depending on the application. In this example, the Wi-Fi device 302-1 may be considered to be a parent device with respect to the Wi-Fi device 302-2 and, conversely, the Wi-Fi device 302-2 may be considered to be a child device of the Wi-Fi device 302-1. Also, the Wi-Fi device 302-2 may be a parent to the Wi-Fi devices 302-3 and 302-4. In this respect, the second Wi-Fi device (i.e., Wi-Fi device 302-2) may include assigned channels based on its parent (i.e., Wi-Fi device 302-1) and may likewise influence the channel assignments for its children (i.e., Wi-Fi devices 302-3 and 302-4).

Each Wi-Fi device 302 includes one or more radios 304-1, 304-2, 304-3, 304-4, respectively. In some embodiments, the one or more radios 304 may be configured to have three channel assignments. For example, the one or more radios 304-1 of the first Wi-Fi device 302-1 may be assigned to operate over channels A, B, and C. In some embodiments, each channel A, B, C may be selected from the accessible channels in three different bands x, y, and z. For example, "band x" may represent the frequency band referred to as the "6 GHz band," "band y" may represent the frequency band referred to as the "5 GHz band," and "band x" may represent the frequency band referred to as the "2.4 GHz band." A controller (not shown) may be configured to perform the assignment of the channels A, B, and C in the one or more radios 304-1 of the Wi-Fi device 302-1.

In addition to the channels A, B, and C being assigned to radios 304-1, two of these assigned channels may then be selected as "connection channels" to be used for communication with the Wi-Fi device 302-2 along a first wireless connection 306-1. Also, the two selected connection channels may also be assigned as either a primary channel or extension channel. In FIG. 5, the primary channels are labeled with an asterisk. Thus, the wireless connection 306-1 may include communication between Wi-Fi devices 302-1 and 302-2 over channel A (as the primary channel) and/or over channel B (as the extension channel) in any suitable manner, as described in more detail below.

Next, after the radios 304-1 of the first Wi-Fi device 302-1 are assigned three channels (A, B, C) and the first wireless connection 306-1 is assigned two channels (A, B) from these three channels, the assignment process may then proceed to the next Wi-Fi device 302-2. The one or more radios 304-2 are assigned channels A and B in order to be able to communicate with the first Wi-Fi device 302-1 via the first wireless connection 306-1. It may be noted that channels A and B are associated with band x and band y, respectively. The assignment of these two channels thereby leaves one channel open for the radios 304-2 of the second Wi-Fi device 302-2. In this example, a new channel (i.e., channel D) may be assigned. Also, channel D may be selected from the band (i.e., band z) that was not used in the wireless connection 306-1. Again, these assignment actions may be performed by a controller in the Wi-Fi system 300.

At this point, in order to mix up the use of different channels, the assignment of connection channels of a second wireless connection 306-2 and third wireless connection 306-3, for communication with the third and fourth Wi-Fi devices 302-3, 302-4, respectively, may include the selection of channels other than the two previous used channels (A, B) and/or switching one of these channels from a primary to an extension channel, or vice versa. In this example, channels A and D are selected as connection channels for the second wireless connection 306-2 and channels B and D are selected as connection channels for the third wireless connection 306-3. Also, channel D is selected as the primary channel in the wireless connection 306-2 and channel B is selected as the primary channel in the wireless connection 306-3. Therefore, the switching around of channels as the primary channels can also be useful in this case for reducing the possibility of interference. Specifically, channels A, D, and B are selected as primary channels in the wireless connections 306-1, 306-2, 306-3, respectively and channels B, A, and D are selected as extension channels in the wireless connections 306-1, 306-2, 306-3, respectively. In this way, when the primary channels are utilized to greater degree, there will be reduced interference in the Wi-Fi system 300. Also, if congestion is detected on the primary channels or the extension channels are utilized according to specific strategies, there will also be reduced interference in the Wi-Fi system 300 based on extension channel use.

Furthermore, to continue illustrating the mixing up of channel assignments, FIG. 5 also shows selected channels that may be used in additional wireless connections 306-4, 306-5 to other Wi-Fi devices (not shown). Particularly, new channel E (band y) is assigned to the radios 304-3 of the Wi-Fi device 302-3 and new channel F (band x) is assigned to the radios 304-4 of the Wi-Fi device 302-4. Further shuffling includes the use of these new channels E and F in the wireless connections 306-4, 306-5, respectively.

Therefore, according to various embodiments of the present disclosure, the Wi-Fi system 300 may include at least first, second, and third Wi-Fi devices (e.g., Wi-Fi devices 302-1, 302-2, 302-3). Each Wi-Fi device may have one or more radios 304 configured to operate over multiple Wi-Fi bands (e.g., band x, y, z, which may represent the 6 GHz, 5 GHz, and 2.4 GHz bands defined in the Wi-Fi protocols). Each Wi-Fi band, for example, include a plurality of accessible channels, as described below with respect to FIGS. 6-8, where each channel has a predetermined frequency range. A first wireless connection (e.g., wireless connection 306-1) is formed between the first and second Wi-Fi devices enabling communication between the first and second Wi-Fi devices. A second wireless connection (e.g., wireless connection 306-2) is formed between the second and third Wi-Fi devices enabling communication between the second and third Wi-Fi devices.

A first group of channels (e.g., A, B, C) selected from the accessible channels of the multiple Wi-Fi bands is assigned to the one or more radios 304-1 of the first Wi-Fi device 302-1. The one or more radios 304-1 of the first Wi-Fi device 302-1 are configured to communicate with the second Wi-Fi device 302-2 via the first wireless connection 306-1 using a first set of connection channels (e.g., A, B) selected from the first group of assigned channels (e.g., A, B, C). Also, a second group of channels (e.g., A, B, D) selected from the accessible channels of the multiple Wi-Fi bands is assigned to the one or more radios 304-2 of the second Wi-Fi device 302-2, the second group of assigned channels including at least the first set of connection channels (e.g., A, B), plus the new channel D. The one or more radios 304-2 of the second Wi-Fi device 302-2 are configured to communicate with the third Wi-Fi device 302-3 via the second wireless connection 306-2 using a second set of connection channels (e.g., A, D) selected from the second group of assigned channels (e.g., A, B, D). The first group of assigned channels A, B, C is different from the second group of assigned channels A, B, D.

A third group of channels (e.g., A, E, D) selected from the accessible channels of the multiple Wi-Fi bands may be assigned to the one or more radios 304-3 of the third Wi-Fi device 302-3. The third group of assigned channels A, E, D may include at least the second set of connection channels A, D. Also, the second group of assigned channels A, B, D may be different from the third group of assigned channels A, E, D. The first set of connection channels A, B may be different from the second set of connection channels A, D. In some embodiments, the Wi-Fi system 300 may further comprise a controller (not shown in FIG. 5), which may be configured to assign the first, second, and third groups of channels to the first, second, and third Wi-Fi devices, respectively. Also, the controller may further be configured to establish the first and second sets of connection channels for the first and second wireless connections, respectively. The controller may further be configured to change the accessible channels of the second group of assigned channels that are not included in the first set of connection channels (e.g., channel C to channel D).

The controller may further be configured to establish the first and second sets of connections channels according to one or more traffic-enhancing techniques, which may include a) enhancing traffic per connection channel, b) enhancing traffic per respective set of connection channels, c) enhancing traffic for the entire Wi-Fi system, d) enhancing traffic with knowledge of traffic loads, e) enhancing traffic with knowledge of traffic flow priorities, f) enhancing traffic with knowledge of Wi-Fi device priorities, g) enhancing traffic with knowledge of capabilities of the sets of connection channels, and/or other techniques. The one or more traffic-enhancing techniques may be based on diversity among the channels of the first set of connection channels and the channels of the second set of connection channels. The one or more traffic-enhancing techniques may be configured to determine a likelihood of contention, collision, and/or interference caused by the same channel being used in both the first and second sets of connection channels and thereby reduce the contention, collision, and/or interference based on the determined likelihood.

In some embodiments, one or more of the Wi-Fi devices 304 may be tri-band Access Point (AP) devices. Each of the first and second wireless connections may be configured to correspondingly pair the Wi-Fi devices in a parent/child relationship as described above. The multiple Wi-Fi bands may include the 2.4 GHz band, the 5 GHz band, and the 6 GHz band defined in the IEEE 802.11 family of protocols, whereby each of the first, second, and third groups of channels may include one or more accessible channels from each of the 2.4 GHz, 5 GHz, and 6 GHz bands. The first set of connection channels 306-1 may include two accessible channels from first and second different Wi-Fi bands x, y and the second set of connection channels 306-2 may include two accessible channels from first and third different Wi-Fi bands x, z. The Wi-Fi system 300 may further include a gateway device (e.g., the Wi-Fi device 302-1 or a device connected to the Wi-Fi device 302-1). The gateway device may be configured to connect the Wi-Fi system 300 to the Internet. The use of connection channels in the 2.4 GHz band (e.g., band z) may be reduced in the topology of the Wi-Fi system 300 near the gateway device (e.g., not used in the first wireless connection 306-1).

Each Wi-Fi device 302 may be configured to utilize the respective one or more radios 304 to simultaneously transmit and receive packets over the respective sets of connection channels 306. For example, in some embodiments, high throughput traffic may be directed in a downlink direction (e.g., parent-to-child or top-to-bottom direction on the page) and low throughput traffic may be directed in an uplink direction (e.g., child-to-parent or bottom-to-top direction on the page).

The assignment of traffic, according to the following description, may be performed by the controller mentioned above. For example, each of the first and second sets of connection channels 306-1, 306-2 may include a primary channel and an extension channel in parallel (A*, B; and D*, A). Each Wi-Fi device 302 may include an aggregation component (not shown) configured to aggregate packets received over the primary channel and extension channel. According to various embodiments, the first set of connection channels 306-1 may include a first accessible channel (A) as the primary channel and a second accessible channel (B) as the extension channel, and subsequent sets of connection channels 306-2, 306-3 may include the second accessible channel (B) as the primary channel (i.e., B* in connection channel 306-3) and/or the first accessible channel (A) as the extension channel (i.e., A in connection channel 306-2). In some embodiments, packets may be transmitted over the primary channels during normal operation and then the packets may be transmitted over the extension channels when there is congestion on the primary channels. In some embodiments, high-priority packets may be transmitted over the primary channels and low-priority packets are transmitted over the extension channels. In some embodiments, airtime usage with respect to the primary channel and extension channel may be partitioned between the primary channel and extension channel according to a predetermined ratio and/or current usage information.

Therefore, according to various implementations, the Wi-Fi system 300 may have at least first, second, and third Wi-Fi devices (e.g., tri-band, mesh, Access Point (AP) devices). The Wi-Fi system 300 may further comprise at least a first wireless logical connection between the first and second Wi-Fi devices and a second wireless logical connection between the second and third Wi-Fi devices. Each wireless logical connection enables communication between the respective pair of Wi-Fi devices (e.g., paired in a parent/child type of relationship). Each Wi-Fi device may be capable of operating over multiple bands (e.g., tri-band, which may include the 2.4 GHz band, 5 GHz band, and 6

GHz band). Each band may include a plurality of accessible (available) channels each having a specific frequency range.

Each Wi-Fi device may be set up (e.g., by a controller) to enable communication over multiple (e.g., 3) selected channels (e.g., one from each band), which may be selected from the accessible (available) channels in the multiple bands. The multiple selected channels may be configured for wireless communication (as the respective wireless logical connection with the corresponding paired Wi-Fi device). Each wireless logical connection may include operational channels strategically assigned from the multiple selected channels, where one operational channel may be picked or assigned as a first ("primary") channel and one or more of the other operational channels may be picked or assigned as one or more secondary channels (e.g., backup, extension, aggregation channels). For each pair of Wi-Fi devices, at least one of the operational channels may be the same as an operational channel of the paired Wi-Fi device and at least one of the operational channels may be different from the operational channels of the paired Wi-Fi device.

FIGS. 6-8 are tables showing frequency ranges of each of a number of the accessible channels with respect to each of the commonly used 2.4 GHz, 5 GHz, and 6 GHz bands defined in IEEE 802.11. Also, for simplicity, not all of the accessible channels are shown in each respective band. Furthermore, certain example channels are highlighted in FIGS. 6-8 simply for the purpose of example and correspond to the channels used in the Wi-Fi system example described below with respect to FIG. 9.

Figure 9:
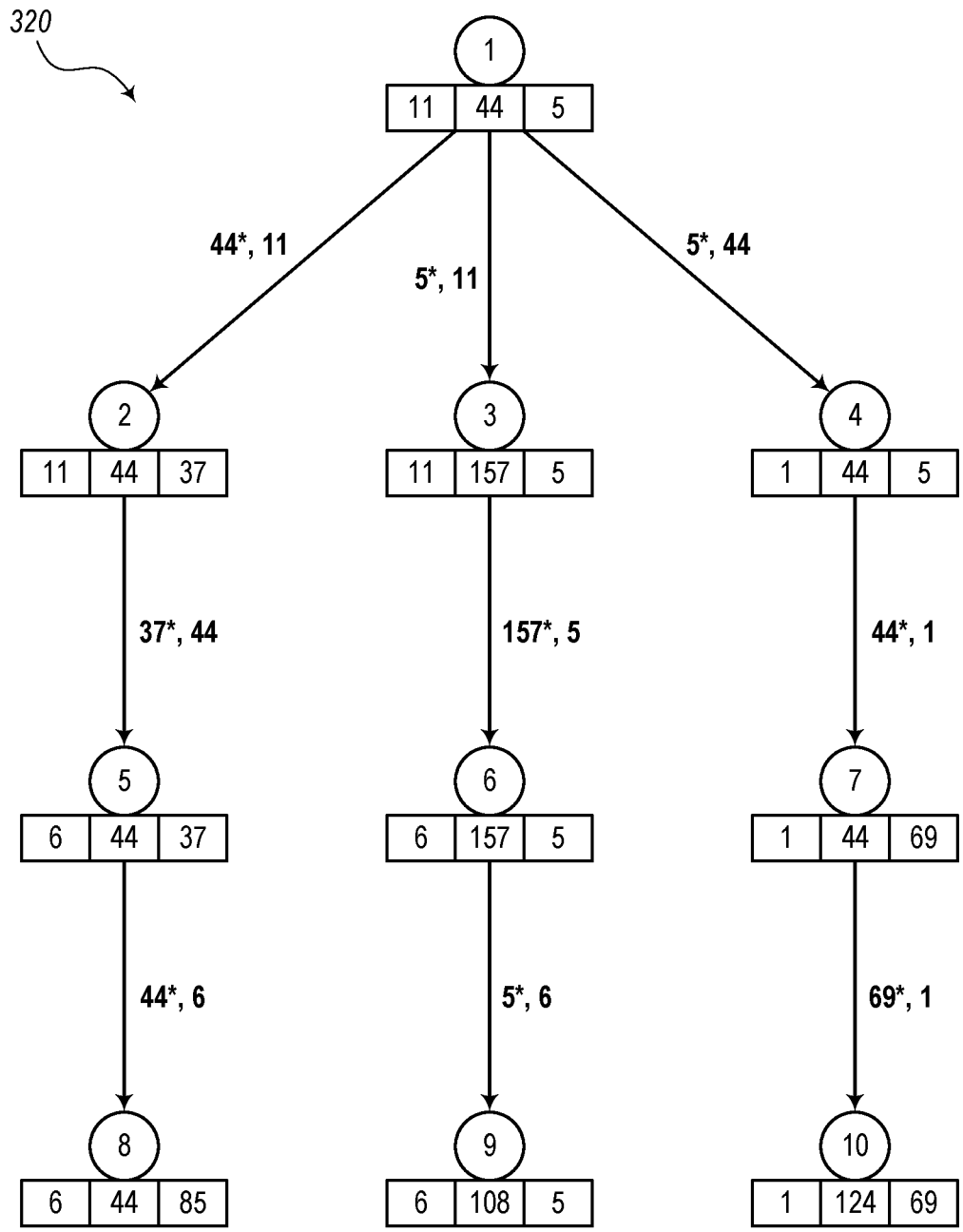
FIG. 9 is a network diagram of Wi-Fi devices arranged with parent/child relationships whereby radios of the Wi-Fi devices are assigned different channels to reduce interference.

FIG. 9 is a network diagram of ten nodes (e.g., Node 1-Node 10), or Wi-Fi devices, arranged with parent/child relationships between pairs of nodes or Wi-Fi devices. Each of the ten Wi-Fi devices include one or more radios that are assigned to communicate over different channels to reduce interference. The channel numbers are selected from accessible channels, whereby the first number designates the channel number of a first band (e.g., the 2.4 GHz band, as shown, in part, in FIG. 6). The second number designates the channel number of a second band (e.g., the 5 GHz band, as shown, in part, in FIG. 7). Also, the third number designates the channel number of a third band (e.g., the 6 GHz band, as shown, in part, in FIG. 8).

Also, two channels from each Wi-Fi device are selected for the connection link or between that Wi-Fi device and each of its child Wi-Fi devices. The first channel number (with asterisk) represents the primary channel for that connection link and the second channel number represent the extended or backup channel. Again, it may be noted that the channel not used in the connection link is replaced in the child Wi-Fi device with another channel from the same band. It may also be noted that a controller may be used to strategically control the assigned channels and connection link channels in a way that spreads out the traffic over many different channels to thereby reduce interference that may occur within the system or from a neighboring Wi-Fi system using the same channels.

I. Properties of an "Ideal" Channel Assignment

The following strategies may be used by a controller using various algorithms or techniques for spreading out the channel usage:

a) If two links in the system use the same first channel, a strategy may include trying to ensure that their second channels are different.

b) If the same pair of channels is used on different links, a strategy may include reversing the channels as to which is the first channel and which is the second channel.

c) One strategy may include alternating the first channel between bands from one hop to another.

d) Another strategy may include allowing the use of the same channel as the primary or secondary channel when the corresponding connection links are far enough away from each other to no longer create significant interference in the network.

e) One strategy may include a full duplex or half duplex arrangement, which is believed to be a novel traffic policy not addressed in the standard. The use of the MLO channels may be roughly segregated by traffic direction (full duplex). For example, there may be two channels between the Wi-Fi devices (or AP devices), where one is in the 5 GHz band (e.g., channel 44) and the other is in the 6 GHz band (e.g., channel 69). Channel 44 may be used for downlink traffic, along with ACKs that come back from that traffic, and channel 69 may be used for the uplink traffic, along with the ACKs that come back from that traffic. This may be more efficient and provide higher throughput than PHY layer ACKs, which are self-organizing and non-colliding, while higher layer ACKs (e.g., TCP ACKs) are not self-organizing.

Furthermore, with respect to duplex arrangement, in a case where duplexing is used as described above, the high throughput channel can be used for the downlink direction and the low throughput channel can be used for the uplink traffic. Another enhancement in this respect is that even the PHY layer ACKs are strictly separated between the uplink and downlink channel. In that case, there would be strict unidirectional traffic flow in each direction, and collisions would essentially be eliminated, although collisions may be eliminated even if only PHY layer ACKs are traveling in the reverse direction. Also, an unequal load of downlink vs. uplink traffic may lead to uneven usage of the channels when segregated by uplink and downlink, which could lead to unequal re-use patterns of the channels within the network, and thus, a strategy may include re-using uplink frequencies many times, while re-using downlink frequencies less frequently.

f) In a system with tri-band APs, two of the channels may be used to form the MLO link. The third radio therefore can have its channel set arbitrarily and can change frequency from what was used in the previous hop. One heuristic rule in this regard may include the strategy of swapping, as often as possible, the channel on the radio/band that was not used as part of the MLO link coming into the Wi-Fi device and then using this new channel as part of the MLO link going out to the next node.

g) Another strategy may include using the 2.4 GHz channels, which may be considered to be poorer in some respects, as late as possible in the pathway from a gateway device (not shown) to end point nodes so as to minimize the traffic that might need to flow across the 2.4 GHz channels. For example, Node 1 may be utilized as the gateway device or may be connected to a gateway device.

h) An additional strategy for spreading out the usage of different channels may include the process of maximizing the diversity of the primary and secondary channels as much as possible. For example, the first hops from Node 1 include different combinations of primary and secondary channels (i.e., 44/11, 5/11, 5/44). Also, this strategy may maximize the diversity in channel pairs, trying to make sure that the same two channels are not used for any of the links in order to avoid two links falling back to the same channel and having a collision when the shared primary channel is congested.

i) In some embodiments, clients may wish to connect on any of the channels being used at an AP. The clients would not be restricted in this respect to thereby avoid the channels being used for backhaul links. This is advantageous to reduce interference and allowing maximum flexibility in choosing the topology of a network. In some cases, the controller may include an optimization module that can calculate an expected throughput for clients connecting on different bands (or channels). This can be used to help steer clients to connections that may perform well or perform better than other options.

II. Planning and Assigning of the Channels and Traffic for Each MLO Connection

Once the topology of the Wi-Fi system 320 is set up (e.g., as controlled by a controller), the controller may then perform additional procedures to dividing traffic between the two channels to provide greater throughput. Some strategies for dividing traffic between the two channels (or among multiple channels, when available) may include the following:

a) Put all traffic on the first channel and use the second channel for traffic only when there is congestion or some other type of failure on the first channel.

b) Put all traffic on the first channel, but when the first channel is congested or faulty, put only high priority traffic on the second channel.

c) Put traffic through both channels.

d) Put all traffic through both channels, but when one becomes congested or faulty, put only the low priority traffic on the secondary channel.

e) Divide the traffic by putting high priority traffic on one channel (e.g., in the 6 GHz band) and putting low priority traffic on the other channel (e.g., in the 5 GHz or 2.4 GHz band).

f) On fronthaul, assigning channel usage by connected device, perhaps with a notion of assigning priority devices to the cleaner channel (e.g., from the 6 GHz band) and assigning lower priority devices to the more congested channels.

g) Separation by priority with no failover.

h) Separation by priority, but when interference occurs, packets can be transmitted on the channel that does not match their priority.

i) Assign traffic by putting downlink on one channel and uplink on a different channel (e.g., a "dual half-duplex" approach).

III. Using Optimization to Plan the Topology for a System Using MLO

Decisions can be made using an optimization module of the controller about how to divide the traffic as part of an optimization process. The optimizer can make decisions for each link in the network, decide a policy for the entire network, decide traffic allocation policy with knowledge of traffic loads, decide a traffic allocation policy with knowledge of traffic flow priorities, decide traffic allocation policy with knowledge of device priorities, and/or decide with knowledge of link capabilities.

Also, optimization may include the following strategies:

a) Objective function modification, such as making the diversity of MLO pairing a factor in the objective function. This may include a) adding a "penalty" in the objective function for having the same pair of channels in an MLO pair and/or b) adding an extra penalty if they have not only the same pair, but also the same arrangement with regard to which is the first channel and second channel.

b) Constraint modifications. In the case that aggregation will be used across both channels in an MLO link, a strategy may include considering the two channels as a single ultra-wide bandwidth channel with about two times the normal capacity and/or data rate. Then, the process may divide down the speed of that link by the number of other links in the Wi-Fi environment (e.g., home) within interference range in order to reflect either time-sharing or frequency-sharing between the two links. For example, in the case of aggregation and partially matching MLO links (e.g., channels A and B on the first link and channel A and C on the second link), the throughput would be reduced by 25% on each for the joint load case as channel A would be in contention, but channels B and C would not be in contention. Also, this strategy will also naturally drive the optimizer to prefer selection of pairs that include two fast channels (e.g., channels from 5 GHz band and 6 GHz band) as opposed to two slower channels (e.g., channels from 2.4 GHz band and 5 GHz band).

In the case that throughput across the two channels in an MLO pair is not going to be aggregated, but rather the second channel will be used only for "failover" when the first channel is occupied or congested, then set up constraints may be used in a strategy to reflect the notion of using only one or the other of the MLO channels at a time. If one of the channels is already in use in the network at a node that would interfere, the second channel could be used to avoid interference and the throughput may be divided between the two hops. Each link may be configured to get the throughput of one channel, and only when there are three or more links, using the same channel pair may include dividing down the throughput.

Furthermore, the optimizer can even select whether aggregation or fallback is the correct configuration on a given link in a given Wi-Fi network. Also, the optimizer may add a penalty to calculate throughput that represents the hop penalty.

c) Another strategy may include configurating the optimizer to consider the statistical likelihood of interference ("odds" of interference), considering the existence of MLO links, and factoring that in the preferred topology.

d) The optimization strategies may also include using the aggregation method to determine the topology even if in practice the network will use the MLO links in fallback mode. This hybrid process simplifies the construction of the optimization and keeps it closer to a current formulation. Having the operation based on the "fallback" method may minimize the collisions, and generally consumes less spectrum under normal operation. It also might show more consistent/reliable latency through the network as there is a "backup channel" available when interference does occur, rather than always depending on both channels to be available.

Along with considering the two channels as being aggregated, the optimizer may also incentivize to choose the best possible first and second channel assignment on each MLO link. This can be done by making the contention penalty on a link that uses the same first and second pair as 100% contention. If the same channels are used but reversed, the contention penalty could be set to a lower percentage, perhaps 50%. If only one of the channels is common between the two MLO links, and it is the second link, the contention percentage could be even lower, say 25%.

According to another option, the optimization strategies may include assigning an arbitrary partitioning of airtime usage between the first and second channels in an MLO link that is operating in fallback mode. For example, perhaps 80% airtime utilization may be applied on the primary channel and 20% airtime usage may be applied on the secondary channel. Then, those airtime values can be degraded based on other users of the same channel and whether they are trying to use it as the first channel (e.g., 80% desired utilization) or the second channel (e.g., 20% utilization).

IV. Balance Between Hops and Channel Diversity

Other optimization strategies may be used to balance the significance of both the hops and the channel diversity throughout the network. In some cases, a decision can be made with respect to a balance between utilization of a channel having a relatively wide bandwidth (e.g., 160 MHz) versus MLO utilization as to when an extension channel is congested. Decisions can also be made with respect to switching to a lower bandwidth channel (e.g., 80 MHz) or using a secondary MLO channel. The optimizer may make decisions on which channel has the highest projected throughput and/or make decisions based on which has the lower chance of congestion, which may be based on analysis of the topology or traffic patterns.

In some cases, the optimization may relax primary channel alignment for 160 MHz, since there may be a secondary MLO channel option when self-interfering happens. Currently, channel 44 (e.g., 160 MHz bandwidth) and channel 60 (e.g., 160 MHz bandwidth) may not allowed due to self-interference. However, this can be relaxed since the backhaul can be switched to the secondary backhaul link (e.g., channel 37 in the 6 GHz band), which may be beneficial in some cases. If the problem is a potential collision, the nodes or Wi-Fi devices might not know to use the second channel on their radios to avoid that collision.

The strategies may include strictly making the alignment of primary channels, which may include aligning primary channels to maximize the chances of seeing the other transmission and avoiding collisions. Also, parallel operation of two transmissions can still be achieved by one of the APs using the second channel of its MLO pair. This is a better tradeoff than sometimes getting parallel operation from being on different primary channels but having more collisions. In the original case with no MLO, getting parallel operation on two separate 80 MHz primary channels may have been more important, but with the existence of the MLO second channel, it may not be as important.

Process Flow Diagram

Figure 10:
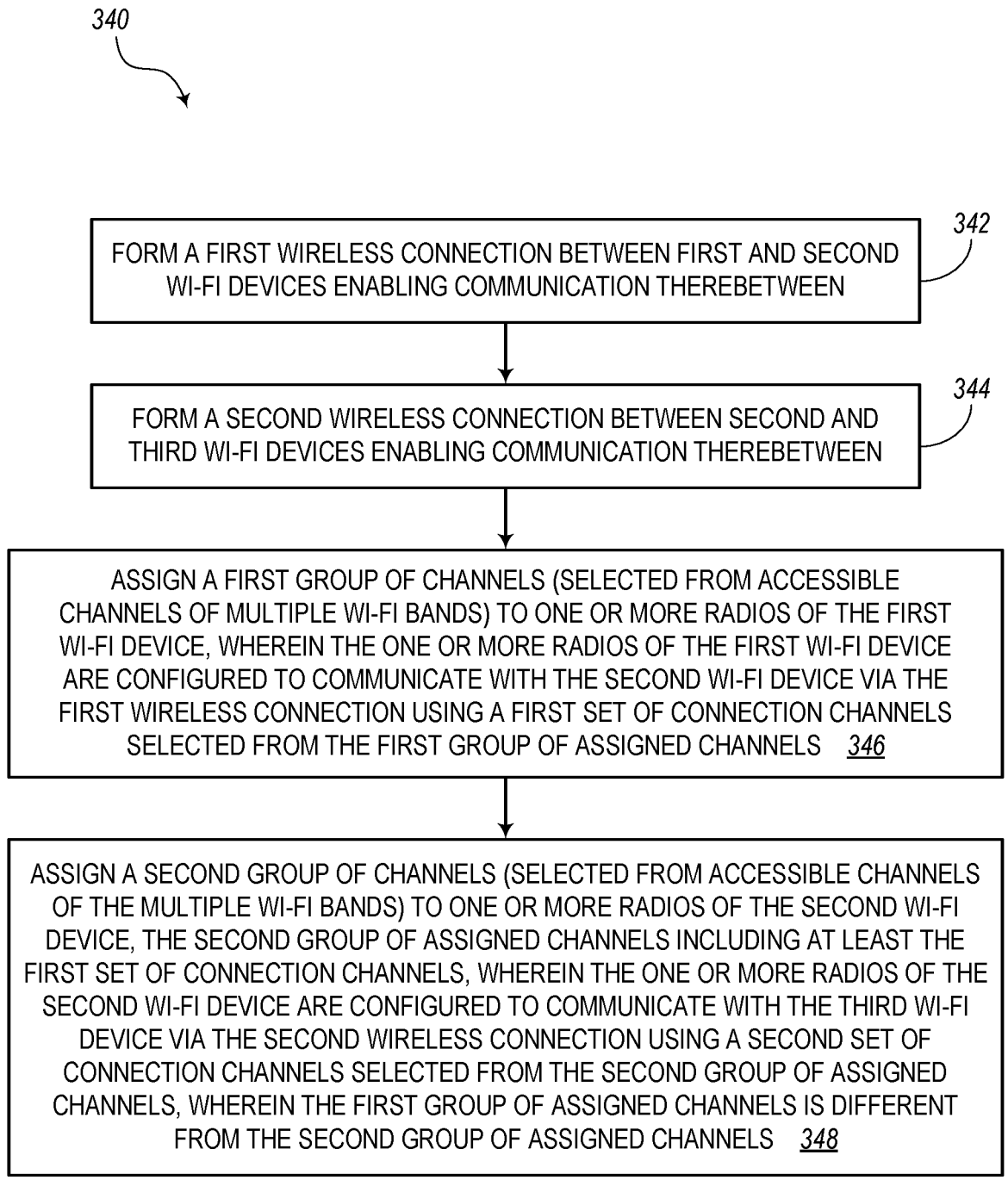
FIG. 10 is a flow diagram of a process for controlling the radios of the Wi-Fi devices of a Wi-Fi system to reduce interference.

FIG. 10 is a flow diagram of a process 340 for controlling the radios of the Wi-Fi devices of a Wi-Fi system to reduce interference. For example, the process 340 may be implemented by a modem/router 30, access point 14, mesh node 18, repeater 20, Wi-Fi device 22, server 200, or other suitable controller in the cloud or in the Wi-Fi system or network. For example, the Wi-Fi system may include at least first, second, and third Wi-Fi devices, where each Wi-Fi device may have one or more radios configured to operate over multiple Wi-Fi bands, each Wi-Fi band including a plurality of accessible channels each having a predetermined frequency range.

As shown in FIG. 10, the process 340 include the step of forming a first wireless connection between the first and second Wi-Fi devices enabling communication therebetween, as indicated in block 342. The process 340 also includes the step of forming a second wireless connection between the second and third Wi-Fi devices enabling communication therebetween, as indicated in block 344.

Next, the process 340 includes the step of assigning a first group of channels (selected from the accessible channels of the multiple Wi-Fi bands) to the one or more radios of the first Wi-Fi device, as indicated in block 346. The one or more radios of the first Wi-Fi device are configured to communicate with the second Wi-Fi device via the first wireless connection using a first set of connection channels selected from the first group of assigned channels. Also, the process 340 includes the step of assigning a second group of channels (selected from the accessible channels of the multiple Wi-Fi bands) to the one or more radios of the second Wi-Fi device, as indicated in block 348. The second group of assigned channels includes at least the first set of connection channels. Also, the one or more radios of the second Wi-Fi device are configured to communicate with the third Wi-Fi device via the second wireless connection using a second set of connection channels selected from the second group of assigned channels. In particular, the first group of assigned channels is different from the second group of assigned channels.

According to additional embodiments, the process 340 may further include assigning a third group of channels (selected from the accessible channels of the multiple Wi-Fi bands) to the one or more radios of the third Wi-Fi device, where the third group of assigned channels may include at least the second set of connection channels. Also, the second group of assigned channels is configured to be different from the third group of assigned channels. Also, the first set of connection channels is configured to be different from the second set of connection channels.

In some embodiments, the process 340 may be performed by a controller configured to assign the first, second, and third groups of channels to the first, second, and third Wi-Fi devices, respectively. The controller may further be configured to establish the first and second sets of connection channels for the first and second wireless connections, respectively. The controller may further be configured to change the accessible channels of the second group of assigned channels that are not included in the first set of connection channels.

The controller can also establish the first and second sets of connections channels according to one or more traffic-enhancing techniques. The one or more traffic-enhancing techniques may include enhancing traffic per connection channel, enhancing traffic per respective set of connection channels, enhancing traffic for the entire Wi-Fi system, enhancing traffic with knowledge of traffic loads, enhancing traffic with knowledge of traffic flow priorities, enhancing traffic with knowledge of Wi-Fi device priorities, and/or enhancing traffic with knowledge of capabilities of the sets of connection channels. Also, the one or more traffic-enhancing techniques may be based on diversity among the channels of the first set of connection channels and the channels of the second set of connection channels. The one or more traffic-enhancing techniques may be configured to determine a likelihood of contention, collision, and/or interference caused by the same channel being used in both the first and second sets of connection channels and thereby may reduce the contention, collision, and/or interference based on the determined likelihood.

The first, second, and third Wi-Fi devices may be tri-band Access Point (AP) devices. Each of the first and second wireless connections may be configured to correspondingly pair the Wi-Fi devices in a parent/child relationship. The multiple Wi-Fi bands may include the 2.4 GHz band, the 5 GHz band, and the 6 GHz band defined in the IEEE 802.11 family of protocols, where each of the first, second, and third groups of channels may include one or more accessible channels from each of the 2.4 GHz, 5 GHz, and 6 GHz bands. The first set of connection channels may include two accessible channels from first and second different Wi-Fi bands and the second set of connection channels may include two accessible channels from first (or second) and third different Wi-Fi bands. A gateway device may be configured to connect the Wi-Fi system to the Internet, wherein the use of connection channels in the 2.4 GHz band is reduced in the topology of the Wi-Fi system near the gateway device.

Each Wi-Fi device may be configured to utilize the respective one or more radios to simultaneously transmit and receive packets over the respective set of connection channels. High throughput traffic may be directed in a downlink direction and low throughput traffic may be directed in an uplink direction.

In some embodiments, each of the first and second sets of connection channels may include a primary channel and an extension channel in parallel. Each Wi-Fi device may include an aggregation component configured to aggregate packets received over the primary channel and extension channel. The first set of connection channels may include a first accessible channel as the primary channel and a second accessible channel as the extension channel. The second set of connection channels may include the second accessible channel as the primary channel and/or the first accessible channel as the extension channel. Packets may be transmitted over the primary channel during normal operation and packets may be transmitted over the extension channel when there is congestion on the primary channel. High-priority packets may be transmitted over the primary channel and low-priority packets may be transmitted over the extension channel. In some cases, airtime usage with respect to the primary channel and extension channel may be partitioned between the primary channel and extension channel according to a predetermined ratio and/or current usage information.

CONCLUSION

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Wi-Fi system comprising:
    at least first, second, and third Wi-Fi devices, each Wi-Fi device having one or more radios configured to operate over multiple Wi-Fi bands, each Wi-Fi band including a plurality of accessible channels each having a predetermined frequency range, wherein:
        a first wireless connection is formed between the first and second Wi-Fi devices enabling communication between the first and second Wi-Fi devices;
        a second wireless connection is formed between the second and third Wi-Fi devices enabling communication between the second and third Wi-Fi devices;
        a first group of channels selected from the accessible channels of the multiple Wi-Fi bands is assigned to the one or more radios of the first Wi-Fi device;
        the one or more radios of the first Wi-Fi device are configured to communicate with the second Wi-Fi device via the first wireless connection using a first set of connection channels selected from the first group of assigned channels;
        a second group of channels selected from the accessible channels of the multiple Wi-Fi bands is assigned to the one or more radios of the second Wi-Fi device, the second group of assigned channels including at least the first set of connection channels;
        the one or more radios of the second Wi-Fi device are configured to communicate with the third Wi-Fi device via the second wireless connection using a second set of connection channels selected from the second group of assigned channels; and
        the first group of assigned channels is different from the second group of assigned channels; and
    a controller configured to assign the first and second groups of channels to the first and second Wi-Fi devices, respectively, the controller further configured to establish the first and second sets of connection channels for the first and second wireless connections, respectively.

2. The Wi-Fi system of claim 1, wherein a third group of channels selected from the accessible channels of the multiple Wi-Fi bands is assigned to the one or more radios of the third Wi-Fi device, the third group of assigned channels including at least the second set of connection channels, and wherein the second group of assigned channels is different from the third group of assigned channels.

3. The Wi-Fi system of claim 1, wherein the first set of connection channels is different from the second set of connection channels.

4. The Wi-Fi system of claim 1, wherein Wi-Fi devices are allowed to connect on the connection channels.

5. The Wi-Fi system of claim 1, wherein the controller is further configured to change the assigned channels of the second group of assigned channels that are not included in the first set of connection channels.

6. The Wi-Fi system of claim 1, wherein the controller is further configured to establish the first and second sets of connections channels according to one or more traffic-enhancing techniques.

7. The Wi-Fi system of claim 6, wherein the one or more traffic-enhancing techniques include enhancing traffic per connection channel, enhancing traffic per respective set of connection channels, enhancing traffic for the Wi-Fi system, enhancing traffic with knowledge of traffic loads, enhancing traffic with knowledge of traffic flow priorities, enhancing traffic with knowledge of Wi-Fi device priorities, and/or enhancing traffic with knowledge of capabilities of the sets of connection channels.

8. The Wi-Fi system of claim 6, wherein the one or more traffic-enhancing techniques are based on diversity among the channels of the first set of connection channels and the channels of the second set of connection channels.

9. The Wi-Fi system of claim 6, wherein the one or more traffic-enhancing techniques are configured to determine a likelihood of contention, collision, and/or interference caused by a same channel being used in both the first and second sets of connection channels and thereby reduce the contention, collision, and/or interference based on the determined likelihood.

10. The Wi-Fi system of claim 6, wherein the one or more traffic-enhancing techniques includes consideration of radio capabilities of client devices connecting to the network.

11. The Wi-Fi system of claim 1, wherein one or more of the first, second, and third Wi-Fi devices are tri-band Access Point (AP) devices.

12. The Wi-Fi system of claim 1, wherein each of the first and second wireless connections is configured to correspondingly pair the Wi-Fi devices in a parent/child relationship.

13. The Wi-Fi system of claim 1, wherein the multiple Wi-Fi bands include the 2.4 GHz band, the 5 GHz band, and the 6 GHz band defined in the IEEE 802.11 family of protocols, and wherein each of the first, second, and third groups of channels includes one or more accessible channels from each of the 2.4 GHZ, 5 GHZ, and 6 GHz bands.

14. The Wi-Fi system of claim 13, wherein the first set of connection channels includes two accessible channels from first and second different Wi-Fi bands and the second set of connection channels includes two accessible channels from second and third different Wi-Fi bands.

15. The Wi-Fi system of claim 13, further comprising a gateway device configured to connect the Wi-Fi system to the Internet, wherein the use of connection channels in the 2.4 GHz band is reduced in the topology of the Wi-Fi system near the gateway device.

16. The Wi-Fi system of claim 1, wherein each Wi-Fi device is configured to utilize respective one or more radios to simultaneously transmit and receive packets over the respective set of connection channels.

17. The Wi-Fi system of claim 16, wherein downlink traffic is directed through the radio that can support higher data rates, and uplink traffic is directed through the radio that can support lower data rates.

18. The Wi-Fi system of claim 1, wherein each of the first and second sets of connection channels includes a primary channel and an extension channel in parallel.

19. The Wi-Fi system of claim 18, wherein each Wi-Fi device includes an aggregation component configured to aggregate packets received over the primary channel and extension channel.

20. The Wi-Fi system of claim 18, wherein the first set of connection channels includes a first accessible channel as the primary channel and a second accessible channel as the extension channel, and wherein the second set of connection channels includes the second accessible channel as the primary channel and/or the first accessible channel as the extension channel.

21. The Wi-Fi system of claim 18, wherein packets are transmitted over the primary channel during normal operation and packets are transmitted over the extension channel when there is congestion on the primary channel.

22. The Wi-Fi system of claim 18, wherein packets are transmitted over the primary channel during normal operation and only high priority packets are transmitted over the extension channel when there is congestion on the primary channel.

23. The Wi-Fi system of claim 18, wherein packets are transmitted over the primary channel during normal operation and low priority traffic is moved to the extension channel when there is congestion on the primary channel.

24. The Wi-Fi system of claim 18, wherein high-priority packets are transmitted over the primary channel and low-priority packets are transmitted over the extension channel.

25. The Wi-Fi system of claim 18, wherein airtime usage with respect to the primary channel and extension channel is partitioned between the primary channel and extension channel according to a predetermined ratio and/or current usage information.

26. The Wi-Fi system of claim 1, where the selection of the channels for assignment, and the selection of channels for connection is determined by an optimization process.

27. The Wi-Fi system of claim 26, wherein the optimization process has an objective function that factors whether connection channels are the same for different wireless connections.

28. A Wi-Fi controller configured to control a Wi-Fi system comprising at least first, second, and third Wi-Fi devices, each Wi-Fi device having one or more radios configured to operate over multiple Wi-Fi bands, each Wi-Fi band including a plurality of accessible channels each having a predetermined frequency range, the Wi-Fi controller comprising a processor and memory configured to store instructions that, when executed, enable the processor to:
    form a first wireless connection between the first and second Wi-Fi devices enabling communication between the first and second Wi-Fi devices;
    form a second wireless connection between the second and third Wi-Fi devices enabling communication between the second and third Wi-Fi devices;
    assign a first group of channels selected from the accessible channels of the multiple Wi-Fi bands to the one or more radios of the first Wi-Fi device, wherein the one or more radios of the first Wi-Fi device are configured to communicate with the second Wi-Fi device via the first wireless connection using a first set of connection channels selected from the first group of assigned channels;

assign a second group of channels selected from the accessible channels of the multiple Wi-Fi bands to the one or more radios of the second Wi-Fi device, the second group of assigned channels including at least the first set of connection channels, wherein the one or more radios of the second Wi-Fi device are configured to communicate with the third Wi-Fi device via the second wireless connection using a second set of connection channels selected from the second group of assigned channels;

wherein the first group of assigned channels is different from the second group of assigned channels; and assign the first and second groups of channels to the first and second Wi-Fi devices, respectively, the Wi-Fi controller further configured to establish the first and second sets of connection channels for the first and second wireless connections, respectively.

29. An Access Point (AP) device of a Wi-Fi system having at least first and second Wi-Fi devices, the AP device and first and second Wi-Fi devices each having one or more radios configured to operate over multiple Wi-Fi bands, each Wi-Fi band including a plurality of accessible channels each having a predetermined frequency range, wherein:

a first wireless connection is formed between the first Wi-Fi device and the AP device enabling communication between the first Wi-Fi device and the AP device;

a second wireless connection is formed between the AP device and the second Wi-Fi device enabling communication between the AP device and the second Wi-Fi device;

a first group of channels selected from the accessible channels of the multiple Wi-Fi bands is assigned to the one or more radios of the first Wi-Fi device;

the one or more radios of the first Wi-Fi device are configured to communicate with the AP device via the first wireless connection using a first set of connection channels selected from the first group of assigned channels;

a second group of channels selected from the accessible channels of the multiple Wi-Fi bands is assigned to the one or more radios of the AP device, the second group of assigned channels including at least the first set of connection channels;

the one or more radios of the AP device are configured to communicate with the second Wi-Fi device via the second wireless connection using a second set of connection channels selected from the second group of assigned channels;

the first group of assigned channels is different from the second group of assigned channels; and the first and second groups of channels is assigned to the first and second Wi-Fi devices, respectively, the first and second sets of connection channels are established for the first and second wireless connections, respectively.

* * * * *